United States Patent

[11] 3,573,463

[72] Inventors Frank E. Goodwin
Malibu;
Floyd C. Trimble, Newberry Park, Calif.
[21] Appl. No. 679,739
[22] Filed Nov. 1, 1967
[45] Patented Apr. 6, 1971
[73] Assignee Hughes Aircraft Company
Culver City, Calif.

[54] LASER HETERODYNE TRANSCEIVER COMMUNICATION SYSTEM WITH AFC
13 Claims, 8 Drawing Figs.

[52] U.S. Cl. .......... 250/199, 332/7.51
[51] Int. Cl. .......... H04b 9/00, H01s 3/10
[50] Field of Search .......... 250/199, (Inquired); 331/94.5, (Inquired); 332/7.51, (Inquired)

[56] References Cited
UNITED STATES PATENTS

| | | | |
|---|---|---|---|
| 3,170,122 | 2/1965 | Bennett Jr. | 331/94.5 |
| 3,175,088 | 3/1965 | Merriott | 250/199 |
| 3,290,503 | 12/1966 | Staufenberg et al. | 250/199 |
| 3,302,027 | 1/1967 | Fried et al. | 250/199 |
| 3,328,583 | 6/1967 | Davison | 250/199 |
| 3,403,257 | 9/1968 | Petroff | 250/199 |
| 3,409,369 | 11/1968 | Bickel | 250/199UX |

OTHER REFERENCES
" Space/Aeronautics," Vol. 39, June, 1963, Page 98+, article by J.R. McDermott (copy made in Group)
IBM Technical Disclosure Bulletin, Vol. 8, No. 9, February, 1966, pg. 1252 (copy made in Group)

*Primary Examiner*—Richard Murray
*Assistant Examiner*—James A. Brodsky
*Attorneys*—James K. Haskell and Paul M. Coble

ABSTRACT: In the disclosed communication system, two transmitter-receiver devices are operatively associated. In each transmitter-receiver two laser beams of different frequencies, one of which laser beams is modulated according to an informational signal, are mixed by means of a beam splitter disposed either inside or outside of the laser oscillator cavity. One of the laser beams is generated by a laser oscillator included in one of the transmitter-receivers, the other laser beam being received from the other distant transmitter-receiver device. The mixed laser beam is translated by a semiconductor photodiode detector into an electrical signal which is then demodulated, the demodulated signal also being used to generate an AFC feedback signal for the laser oscillator.

INVENTORS.
FRANK E. GOODWIN,
FLOYD C. TRIMBLE,
Paul M. Coble
ATTORNEY

Patented April 6, 1971 3,573,463

4 Sheets-Sheet 3

LASER HETERODYNE TRANSCEIVER COMMUNICATION SYSTEM WITH AFC

This invention relates to communication by means of laser beams; more particularly, it relates to various devices for simple and easy communication using a heterodyne detection technique on frequency or amplitude-modulated laser beams.

Prior art optical communication techniques have generally utilized noncoherent or quantum detection principles. Systems embodying such principles have included: amplitude-modulated noncoherent sources (arc lamps, etc.) operated in conjunction with conventional infrared thin film detectors; amplitude-modulated lasers operated in conjunction with photomultipliers in the visible range and in conjunction with photoconductors or photodiodes in the infrared frequency range; pulse-code or carrier-modulated lasers used in conjunction with conventional detectors to better overcome the effects of atmospheric turbulence noise; and amplitude-or pulse-modulated gallium arsenide lasers used in conjunction with conventional detectors.

Photoemissive quantum detection (photomultipliers) has been used successfully for optical communication in the visible part of the spectrum, because the inherent electronic gain of the photomultiplier substantially eliminates the problem of amplifier noise usually associated with low level signal detection. In the infrared frequency range, however, the photoemissive surfaces are not as sensitive. The detection level decreases rapidly as a function of frequency, making the use of photoemissive detectors not practical for infrared detection. In the infrared frequency range, quantum detection, i.e., detection of photons, is better achieved with semiconductor or superconductor photodiode detectors. In spite of high quantum efficiency of the semiconductor or superconductor detectors, the absence of internal gain in the device makes the noise factor in a necessarily associated signal amplifier a dominant factor in the ultimate output of a communication system receiver.

Optical heterodyne detection in the infrared frequency range provides inherent gain (conversion gain) sufficient to reduce the detrimental effect of receiver noise on the detected signal. In this respect, since the decreased effect of receiver noise allows an efficient and practical communication system to be realized, optical heterodyne detection achieves for the infrared range what the photomultiplier has achieved for the visible part of the spectrum. Moreover, optical heterodyne detection allows both the transmission and reception of either amplitude or frequency-modulated signals.

The use of optical frequency modulation affords a marked advantage in communication through a hostile environment; it eliminates, among other things, the problem of amplitude noise modulation as the signal travels through the atmosphere. Moreover, heterodyne detection using frequency modulation not only allows a greater operating range with less transmitting power, but it also facilitates broadband operation through the use of electrooptic modulators and point-contact photodiode detectors. If communication is through a substantially nonhostile environment, such as space, amplitude modulation may be successfully used. Greater security from unwanted detection can be maintained because of the ability of a heterodyne communication system to operate far into infrared frequencies, a part of the spectrum where photoemissive devices do not operate satisfactorily.

In practice, the technique of optical heterodyne detection has previously been limited to systems in which the modulated and the local oscillator signals are both derived from one primary oscillator through the use of single sideband modulators. However, on account of the necessary mirror-beam splitter configuration associated with such a system, this configuration resulted in a great loss of power. Moreover, such systems could not be used for practical communication since the systems were limited to, roughly, a transmitter and a receiver station, which did not allow the flow of information to be reversed. Also, such prior art optical heterodyne systems did not incorporate features for sending a signal across large distances and were therefore not suited for long distance communication purposes. Thus, a simple and expedient way to apply optical heterodyne detection to an efficient and useful laser long distance communication system would be of great value to the art.

Accordingly, it is an object of the present invention to provide a simple and efficient means for communication.

It is a further object of the present invention to provide a heterodyne, quantum-limited detection system that can provide good resolution of incoming information.

It is a still further object of the present invention to provide an efficient laser communication device that can both transmit and receive.

It is another object of the present invention to provide a laser communication system which is operable with frequency-modulated laser beams.

It is yet another object of the present invention to provide a laser communication system which is operable with amplitude-modulated laser beams.

It is still another object of the present invention to provide a laser communication system wherein minimum energy loss takes place.

It is a still further object of the present invention to provide a communication system wherein minimum energy loss takes place.

It is a still further object of the present invention to provide a communication system consisting of two identical laser beam transmitter -receivers such that each transmitter-receiver can both transmit and receive information.

In accordance with the foregoing objects, a laser communication heterodyne transmitter-receiver according to the present invention includes a device for generating a laser beam of a first frequency and at least one beam splitter for mixing with the generated laser beam a laser beam of a second frequency which is different from the first frequency and which beam is received from a distant similar transmitter-receiver device. One of the laser beams is modulated according to an informational signal. An optic-to-electric energy transducer converts the mixed laser beam into a modulated electrical signal which is subsequently demodulated to recover the informational signal. A pair of the transmitter-receiver devices may be utilized to provide a long range communication system in which the advantages of heterodyne laser detection may be realized.

Other objects, advantages and characteristic features of the present invention will become more fully apparent from the following detailed description of preferred embodiments of the invention when considered in conjunction with the accompanying drawings, in which:

FIG. 1 is a functional-type schematic diagram illustrating a laser communication transmitter-receiver according to one embodiment of the present invention;

FIG. 1*a* is a functional-type schematic diagram illustrating a modified laser oscillator arrangement for the transmitter-receiver of FIG. 1;

FIG. 1*b* is a functional-type schematic diagram showing another modified laser oscillator arrangement for the transmitter-receiver of FIG. 1;

FIG. 1*c* is a functional-type schematic diagram illustrating a laser communication transmitter-receiver arrangement in accordance with a further embodiment of the invention;

Figure 1:
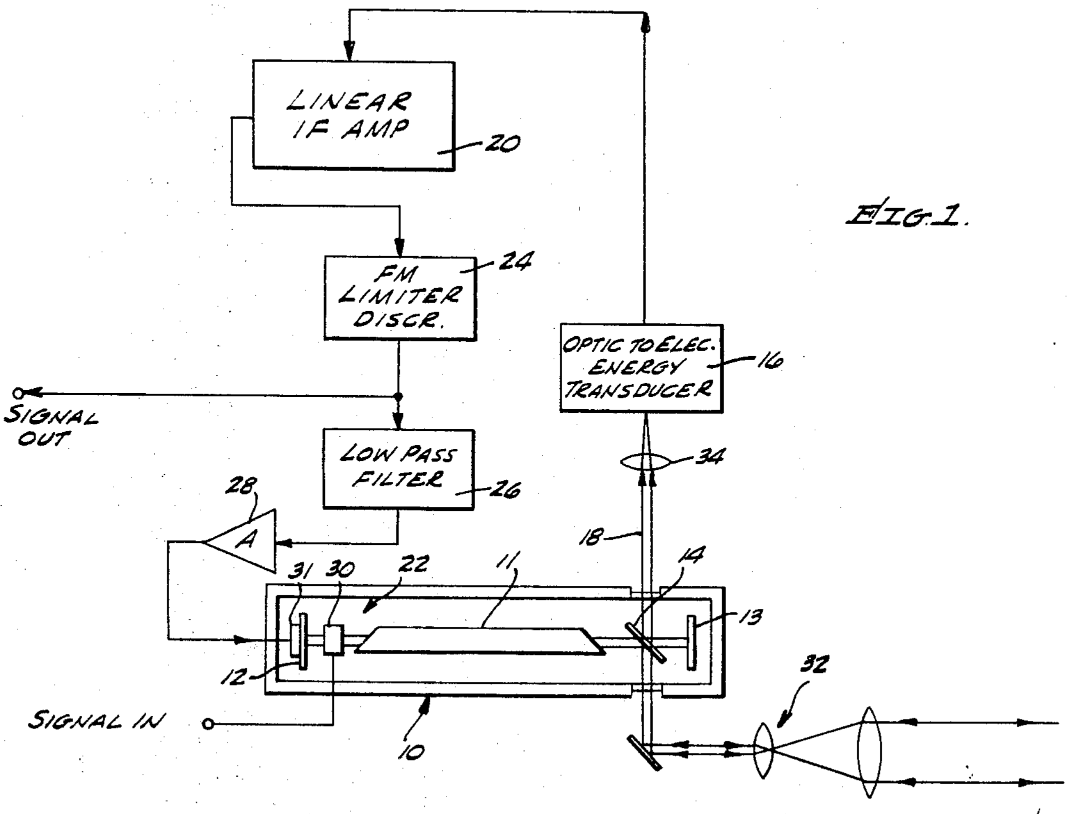

Referring to FIG. 1 with greater particularity, there is shown a laser oscillator 10 of conventional design. The laser oscillator 10 may be any one of a variety of lasers having low noise characteristics: for example, a 3.39$\mu$ cold cathode helium-neon gas laser, or a 10.6$\mu$ carbon dioxide laser, etc.

As shown in FIG. 1, the laser oscillator 10 includes a laser medium 11 which is pumped to a condition of stimulated emission by a pumping source (not shown) and which is disposed between end reflectors 12 and 13, capable of reflecting the resultant coherent light generated in the medium 11 into a regenerative path through the medium 11. For purposes of discussion, a laser oscillator cavity 22 is defined as the space between and including the end reflectors 12 and 13. Within the laser oscillator cavity between the medium 11 and one of the end reflectors (for example 13) and in the path of the generated coherent light beam, there is located a low reflectivity beam splitter 14 which may take the form of an optical flat. For a 3.39$\mu$ helium-neon gas laser the beam splitter 14 preferably has a reflectivity of about 5 percent.

The modulation of the optic beam to be transmitted is a necessary part of the operation of the communication system. A direct method of modulating the frequency of the laser oscillator 10 is by varying the electrical length of the cavity 22; i.e., change the number of wavelengths of the laser beam between end reflectors 12 and 13. An electrooptical modulating means 30, such as an electrooptical crystal located inside the laser cavity 22 between end reflectors 12 and 13 and in the path of the laser energy beam, with a principal axis parallel to the crystal polarization direction, may be used to vary the laser output frequency in accordance with a modulating electrical input signal. Such an electrooptic modulation means is desirable for wideband modulation although, of course, the use of other modulating devices is possible.

Figure 1A:
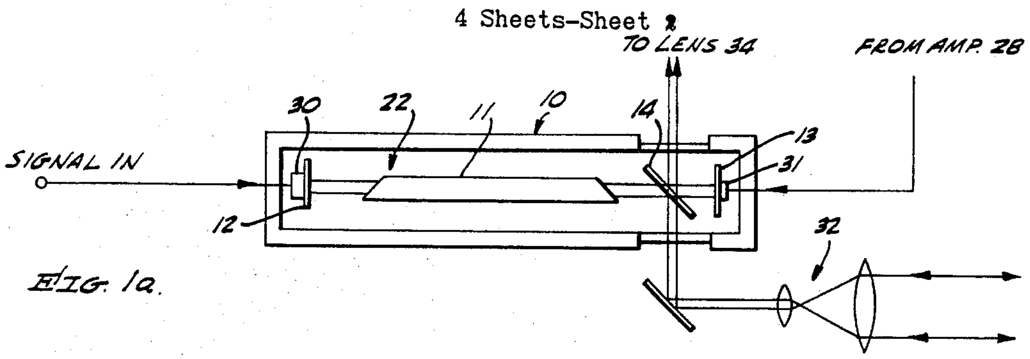
Figure 1B:
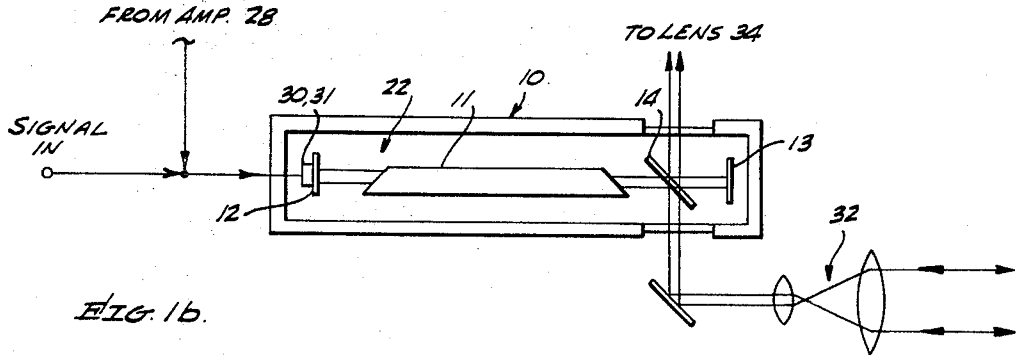

FIGS. 1*a* and 1*b* illustrate respective modifications to the transmitter-receiver of FIG. 1, wherein the end reflector 12 is mechanically moved by a piezoelectric crystal or an electroacoustic transducer such as a capacitor microphone which serves as modulating means 30 so as to change the actual distance the laser beam travels within the laser cavity 22; i.e., change the distance between end reflectors 12 and 13. A capacitor microphone in which the microphone diaphragm may be a gold-coated quartz flat which serves as the moving end reflector 12 or 13 may be used; good fidelity can be achieved by this technique. Using the capacitor microphone modulation configuration, an audio input voltage of 100 mV. is sufficient to give 50 kHz. of frequency deviation of the laser signal. The above-mentioned techniques of modulation of the laser beam are in no way to be construed as limiting the present invention, but rather are given merely for illustrative purposes.

Referring again to FIG. 1, a telescope 32 allows an optical beam as partially reflected from beam splitter 14 to be properly focused for transmission to a distant transmitter-receiver device, or in a receiving operation, the telescope 32 focuses a received energy beam onto the beam splitter 14. Optic beam 18 emanating from the beam splitter 14 is a mixed laser optic beam consisting of a modulated laser beam and another laser beam, the mixed optic beam 18 having a heterodyne beat frequency in an intermediate frequency range. The beam 18 is focused via a lens 34 onto an optic-to-electric energy transducer 16. The optic-to-electric energy transducer 16 may be an indium arsenide diode or other semiconductor-type detector, for example; or, it may be of the superconductor point-contact diode variety. The transducer 16 converts the mixed frequency-modulated optic beam 18 into an electrical signal which is also frequency-modulated and whose instantaneous phase is substantially the same as that of the mixed optical beam 18.

The frequency-modulated electrical signal from the optic-to-electric energy transducer 16 is amplified by a linear IF amplifier 20, the output signal from which is applied to a frequency modulation limiter-discriminator 24. The function of the limiter-discriminator 24 is first to eliminate excessive amplitude excursions (most of which are caused by atmospheric disturbances) from the frequency-modulated signal, and second to convert frequency deviations from the carrier frequency into corresponding signal amplitude variations. The resulting amplitude-varying signal can be applied to an appropriate detector and resolved into either an audio or video signal, or a multiplex of audio or video signals.

A low-pass filter 26 transmits amplitude-varying signals from the limiter-discriminator 24 below a certain frequency, while substantially attenuating signals above this frequency, and applies the transmitted signals to an amplifier 28. These signals are in actuality slowly varying DC voltages since most of the higher frequency amplitude excursions have been eliminated from the amplitude-varying signal by low-pass filter 26. The output from the amplifier 28 is used as an automatic frequency control AFC signal which is fed back to a modulating laser frequency-regulating means 31, which may be mechanically coupled to either of the end reflectors 12 or 13. The frequency-regulating means 31 may be an electrostatic transducer or a piezoelectrical crystal; it can also be an electrooptic crystal. The frequency-regulating means 31 varies the frequency of the laser beam according to the relatively slowly varying AFC voltage in the same way the optical beam is modulated. Also, the modulating means 30 can be used to regulate the laser frequency as illustrated in FIG. 1*b*, in which case the AFC signal would energize the modulating means 30. The feedback loop functions to maintain the output frequency of the laser oscillator 10 at a constant value.

In a laser communication system according to the present invention, at least two transmitter-receiver devices must be employed in order to achieve the desired communication. The distance between the end reflectors 12 and 13 of the transmitting transmitter-receiver device is made slightly different from that of the associated receiving device. Since the output frequency of the laser oscillator 10 is a function of its end reflector separation distance, a frequency differential, or heterodyne beat frequency $f_{IF}=f_{receiving}-f_{transmitting}$ results between the transmitting and receiving devices. The operational frequency of the IF amplifier 20 is selected so that it operates at this differential frequency or heterodyne beat frequency, $F_{IF}$; the bandwidth of the amplifier 20 must be large enough to accommodate all frequency aberrations from $f_{IF}$. For a system employing a helium-neon gas laser oscillator 10, $f_{IF}$ may be of the order of 10 MHz. (but it also may be as high as 1 kMHz.), for example.

When the transmitter-receiver of FIG. 1 is in a transmitting operation, a coherent beam of light of carrier frequency $f_1$ generated by the laser oscillator 10 is frequency modulated by the modulating means 30 in accordance with an informational signal to be transmitted. The frequency $f_1$ is selected to be above the highest frequency of any atmospheric disturbance, or any other environmental disturbance, expected to be encountered. For the aforementioned beam splitter reflectivity, about 5 percent of the modulated laser beam energy is reflected by the beam splitter and directed outside of the laser oscillator 10 through the telescope 32 toward a distant receiving transmitter-receiver device. Only a relatively small percentage of the total laser beam generated by laser oscillator 10 can be used for transmitting outside of the laser oscillator system, the remainder of the generated laser beam is needed to regenerate the laser medium 11 in order to keep the oscillator 10 operational.

The part of the generated laser beam not reflected outside of laser oscillator 10 through telescope 32 passes through beam splitter 14 and is reflected by end reflector 13. The beam splitter 14 reflects about 5 percent of the laser beam energy reflected by reflector 13 via lens 34 toward transducer 16. A received unmodulated laser beam at frequency $f_2$, generated by a laser oscillator in the distant transmitter-receiver device that is receiving the modulated laser beam directed through telescope 32, passes through beam splitter 14 (except for about 5 percent which is reflected by beam splitter 14 through the laser medium 11) and is mixed with the 5 percent of the laser beam energy which is reflected by beam splitter 14 toward transducer 16. The frequency difference between $f_1$ and $f_2$ is equal to the aforementioned $f_{IF}$ in the intermediate frequency range. The mixed beam 18 is directed by beam splitter 14 toward optic-to-electric transducer 16 via lens 34. The transducer 16 converts the beam into an electrical signal from which the aforementioned AFC feedback voltage for the laser oscillator 10 is generated. In steady state operation of the transmitter-receiver, one-half of the available output power of the laser is reflected by beam splitter 14 toward transducer 16, the other half being reflected toward telescope 32.

When the transmitter-receiver of FIG. 1 is in a receiving operation, 95 percent (or other percentage, depending on the reflectivity of the beam splitter 14) of an incoming laser beam, frequency modulated according to an information signal centered about a carrier frequency $f_2$ and transmitted by a distant transmitter-receiver device, passes directly through the beam splitter 14 to the transducer 16; the other 5 percent of the incoming laser beam is reflected by beam splitter 14 and is directed into the laser medium 11 where it is amplified. This incoming laser beam will be mixed with a local laser oscillator beam at frequency $f_1$. Since the portion of the incoming laser beam that is reflected by beam splitter 14 (about 5 percent) makes a forward and backward pass through the medium 11, after which it is partially reflected toward transducer 16 in phase with the original received beam, the incoming beam experiences a net amplification.

Again, in steady state operation, one-half of the available output power of the laser oscillator 10 is reflected by beam splitter 14 toward transducer 16, the other half being reflected toward telescope 32. This latter half of the output power at frequency $f_1$ is mixed with a portion of the locally generated modulated laser beam at carrier frequency $f_2$ at the distant transmitting transmitter-receiver device (which is sending the aforementioned incoming modulated laser beam) to form a resultant heterodyne beat frequency $f_{IF}$ beam which will ultimately provide an AFC voltage for the laser oscillator of that distant device. The former half of the output power at frequency $f_1$ is mixed with the incoming beam at frequency $f_2$. The resultant mixed beam 18 is directed, via lens 34, to optic-to-electric transducer 16. The heterodyne beat frequency $f_{IF}$ is the difference between the incoming beam frequency $f_2$ and the local oscillator beam frequency $f_1$. The net effect is that a minimum of optical power is lost to the environment outside of the system.

Transducer 16 converts the mixed optical beam into an electrical signal which is amplified by IF amplifier 20. The output of IF amplifier 20 is directed into FM limiter-discriminator 24 for an amplitude-varying output signal indicative of the informational signal on the incoming laser beam. The amplitude-varying output of the limiter-discriminator 24 is applied via the low-pass filter 26 to amplifier 28. The resulting, relatively slowly varying DC signal provides the AFC control voltage for the local laser oscillator 10.

It should be noted that a laser communication system according to the invention utilizes two transmitter-receiver devices which have similar operational features. The same device may be used to both transmit and receive. A major advantage of the above described embodiment is that a minimum of optical power is lost within the communication system. An ideal laser communication system is thereby described, where quantum-limited detection is achieved, and a minimum of power loss is experienced in the optical system.

Figure 1C:
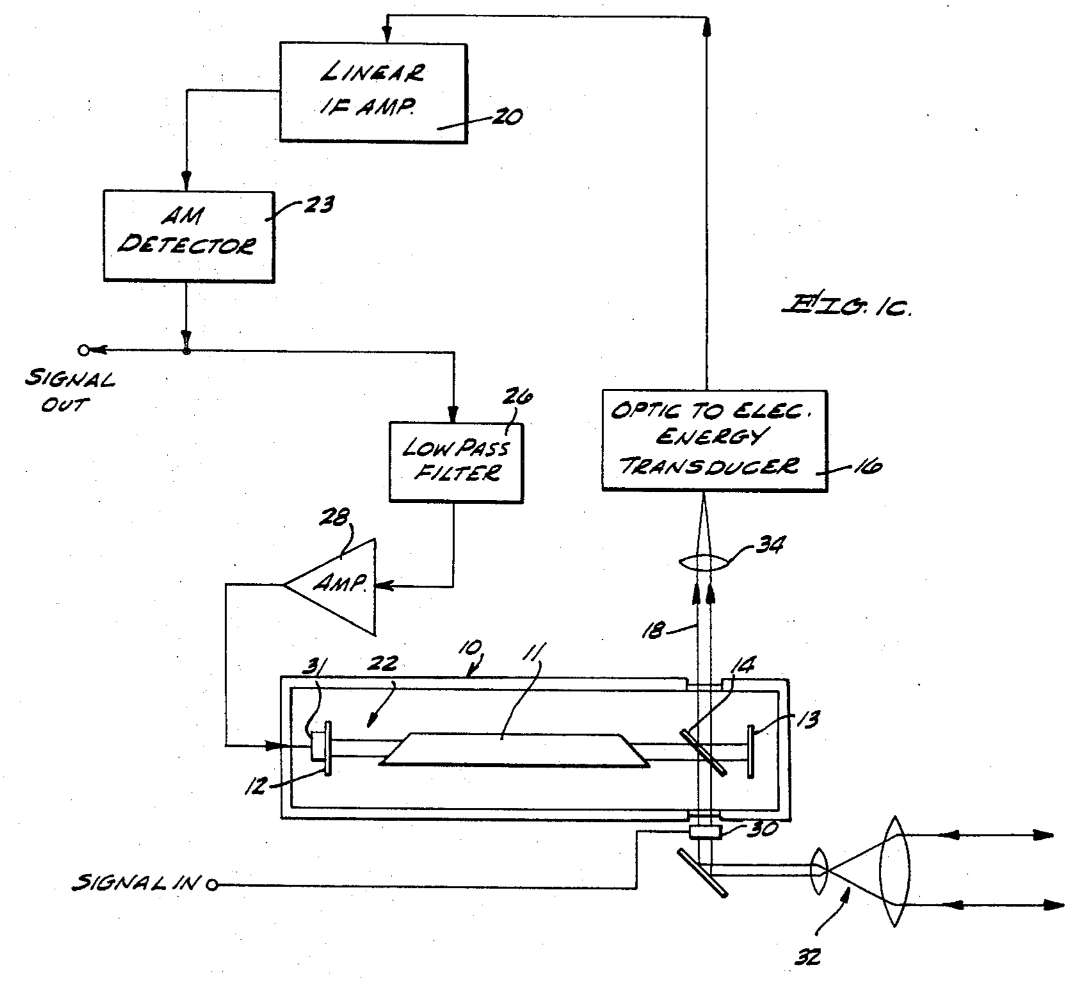

An alternate embodiment of the invention is illustrated in FIG. 1*c*. The embodiment illustrated in FIG. 1*c* is substantially the same as the embodiment illustrated in FIG. 1 except that in the former, the transmitter-receiver is modified to receive and transmit amplitude-modulated laser beams. In FIG. 1*c* embodiment the laser beam modulation means 30 (which may be an electrooptic cell as discussed above) is placed outside of the laser oscillator 10 in alignment with the generated laser beam. There the electrooptic cell serves as an electrically actuated filter which decreases or increases the intensity of the laser beam in accordance with an informational signal as the beam passes through the cell. Moreover, mixed beam 18, instead of being a mixed frequency-modulated beam (as it is in the embodiment as illustrated in FIG. 1), is now a mixed amplitude-modulated beam. Therefore, the optic-to-electric energy transducer 16 will convert the mixed laser amplitude-modulated signal into a corresponding electrical amplitude-modulated signal which is amplified by linear IF amplifier 20. The amplified amplitude-modulated electrical signal from IF amplifier 20 is applied to an amplitude modulation detector 23 which provides an output electrical signal which varies in amplitude in accordance with the envelope of the amplitude-modulated signal from the amplifier 20. The output signal, which is indicative of the informational signal on the incoming amplitude-modulated laser beam when the device is in a receiving operation, is applied to a low-pass filter 26 and subsequently to an amplifier 28 to complete the aforementioned AFC feedback loop.

It is pointed out that the amplitude modulation modification illustrated by FIG. 1*c* may be added to the FIG. 1 embodiment, thereby allowing the transmitter-receiver to transmit and receive both amplitude- and frequency-modulated signals; alternatively, it may be used as illustrated, whereby the transmitter-receiver is able to receive or transmit amplitude-modulated laser beams only.

Figure 2:
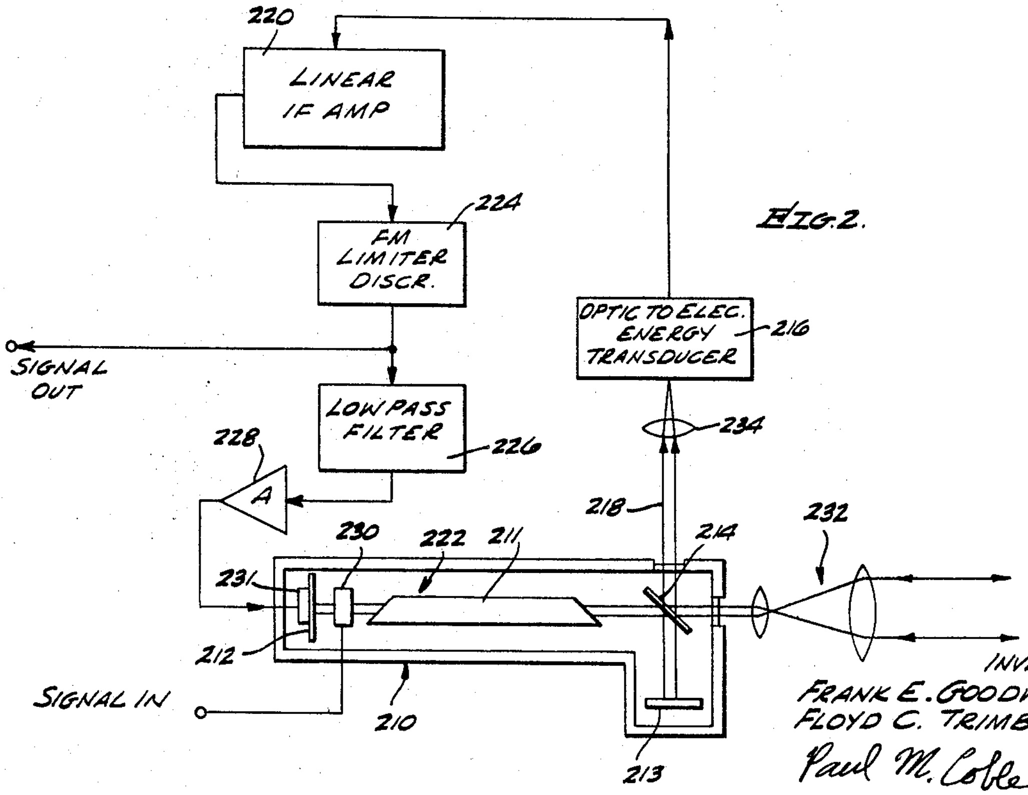
FIG. 2 is a functional-type schematic diagram illustrating a laser communicator transmitter-receiver in accordance with another embodiment of the invention.

Another embodiment of the invention is illustrated in FIG. 2. Those elements of this embodiment that are the same as elements of the embodiment of FIG. 1 carry the same numerical indication as elements of FIG. 1 except that the reference number is preceded by 2. However, in the embodiment of FIG. 2 the end reflectors 212 and 213 are not optically parallel as in the embodiment illustrated in FIG. 1, but are disposed at an angle, illustrated in FIG. 2 as 90°, with respect to one another. Also, the beam splitter 214 has a higher reflectivity, for example, 95 percent.

While transmitting, about 5 percent, for example, of the laser energy beam generated by laser oscillator 210 is transmitted through telescope 232 toward a distant receiving transmitter-receiver device; another 5 percent of the generated laser beam being mixed with an unmodulated laser beam from the distant receiving device which is at a substantially different frequency from the generated laser beam. The resultant mixed beam is converted into an electrical signal which is fed back through the AFC loop.

While receiving, 95 percent, for example, of the incoming laser beam signal transmitted by a distant transmitter-receiver device is reflected by beam splitter 214, through lens 234 and onto optic-to-electric energy transducer 216. The other 5 percent, for example, of the incoming laser beam signal passes through the laser cavity 222 and is amplified, beam splitter 214 serving as the mixing means for the modulated incoming laser beam signal and the local laser oscillator beam. A portion of the local oscillator beam is reflected outside of the cavity 222 and, via telescope 232, transmitted toward the distant transmitting device where it will serve to mix with a portion of the modulated, locally generated laser beam (a portion of which provides the incoming beam to the receiving device) in the distant device so as to ultimately provide an AFC voltage for the distant transmitting device's laser oscillator. The remainder of the operation of the embodiment of FIG. 2 is substantially the same as the operation of the embodiment illustrated in FIG. 1. In the FIG. 2 embodiment, also, a minimum of power is lost by the optical system. It is further pointed out that the embodiment of FIG. 2 alternatively may employ the feedback frequency-regulating means of FIGS. 1*a* and 1*b* and the amplitude modulation transmission and reception modification of FIG. 1*c*.

Figure 3:
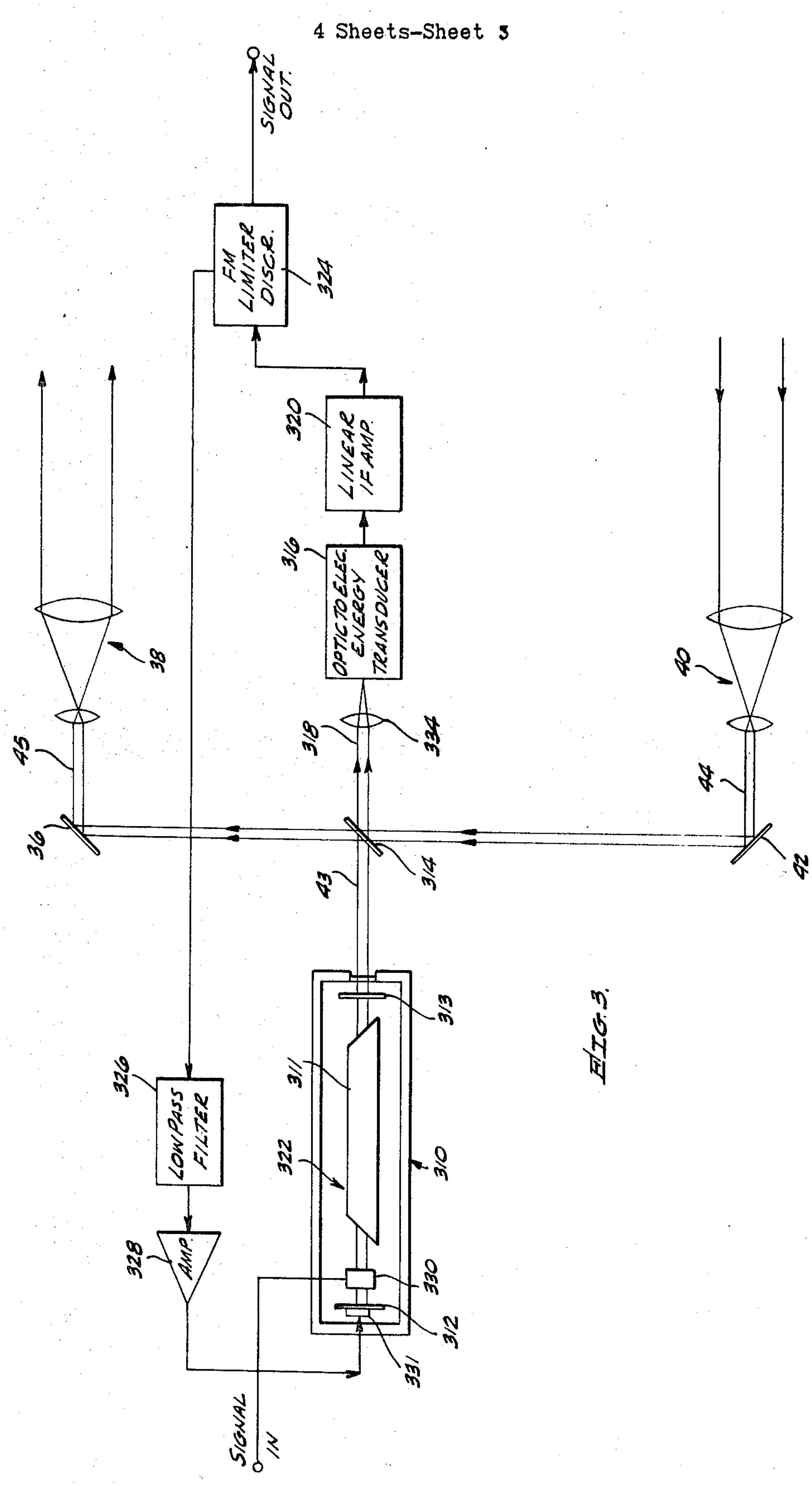
FIG. 3 is a functional -type schematic diagram illustrating a laser communicator transmitter-receiver in accordance with still another embodiment of the invention.

Another embodiment of the invention is illustrated in FIG. 3. Those elements of the embodiment illustrated in FIG. 3 that are the same as elements of the embodiment illustrated in FIG. 1 carry the same numerical indication as the FIG. 1 elements except that they are preceded by the number 3. In the FIG. 3 embodiment beam splitter 314 is situated outside of laser cavity 322. The reflectivity of the beam splitter 314 in this embodiment may be, for example, 50 percent. Also, the reflectivity of end reflector 313 is lower than in the FIG. 1 and 2 embodiments (and may be about 90 percent, for example) so as to allow a significant portion of the laser beam generated by laser oscillator 310 to pass through. Two paths are employed, one for the incoming laser beam and one for the outgoing laser beam.

In transmitting, laser energy beam 43 is generated in laser oscillator 310 and modulated by modulating means 330. About one-half of the laser beam 43 (or other fraction, depending on the reflectivity of the beam splitter 314 used) is deflected by the beam splitter 314 toward reflector 36 which again deflects this half of the beam 43. The resultant outgoing deflected laser beam 45 is then transmitted through telescope 38 from where it is radiated to a distant receiving transmitter-receiver device. Essentially the other half of the laser beam 43, designated in FIG. 3 as 318, is transmitted through the beam splitter 314 where it is mixed with a received laser beam transmitted by the distant receiving device of substantially different frequency from that of beam 43. The mixed beam is directed, via lens 334, to optic-to-electric energy transducer 316. The transducer 316 generates the electric signal for the AFC feedback loop.

In receiving, the incoming laser beam 44 transmitted at a distant transmitter-receiver device is received through telescope 40, and then deflected by reflector 42 so that the beam will strike beam splitter 314 along substantially the same area as does the beam 43. Reflector 42 serves mainly to align the incoming modulated beam 44 and the generated beam 43 in a substantially planar configuration and generally in such a fashion that the two beams will be mixed at beam splitter 314. The 50 percent of the incoming beam 44 that is reflected by beam splitter 314 and the 50 percent of the beam 43 that is transmitted through beam splitter 314 are mixed to form beam 318 which passes through lens 334 into the transducer 316. The 50 percent of the received beam transmitted by beam splitter 314 and the 50 percent of beam 43 reflected by beam splitter 314 are transmitted through the outgoing signal path toward the distant device (which is transmitting the incoming beam). The 50 percent of beam 43 which is transmitted toward the distant device is subsequently mixed with a portion of the locally generated beam at the distant transmitting device so as to ultimately provide an AFC voltage for the distant device's laser oscillator. The 50 percent of the received beam 44 which is transmitted is essentially lost to the system. The remainder of the operation of the embodiment of FIG. 3 is substantially the same as that of the embodiment illustrated in FIG. 1. The FIG. 3 embodiment, however, as compared with that illustrated in FIG. 1, loses approximately 3 decibels of optical power through the beam splitter 314. Moreover, it should be understood that the embodiment of FIG. 3 may employ the alternative feedback frequency regulating means of FIGS. **1*a* and 1*b* and the amplitude modulation transmission and reception modification of FIG. 1*c***.

Figures 4, 5:
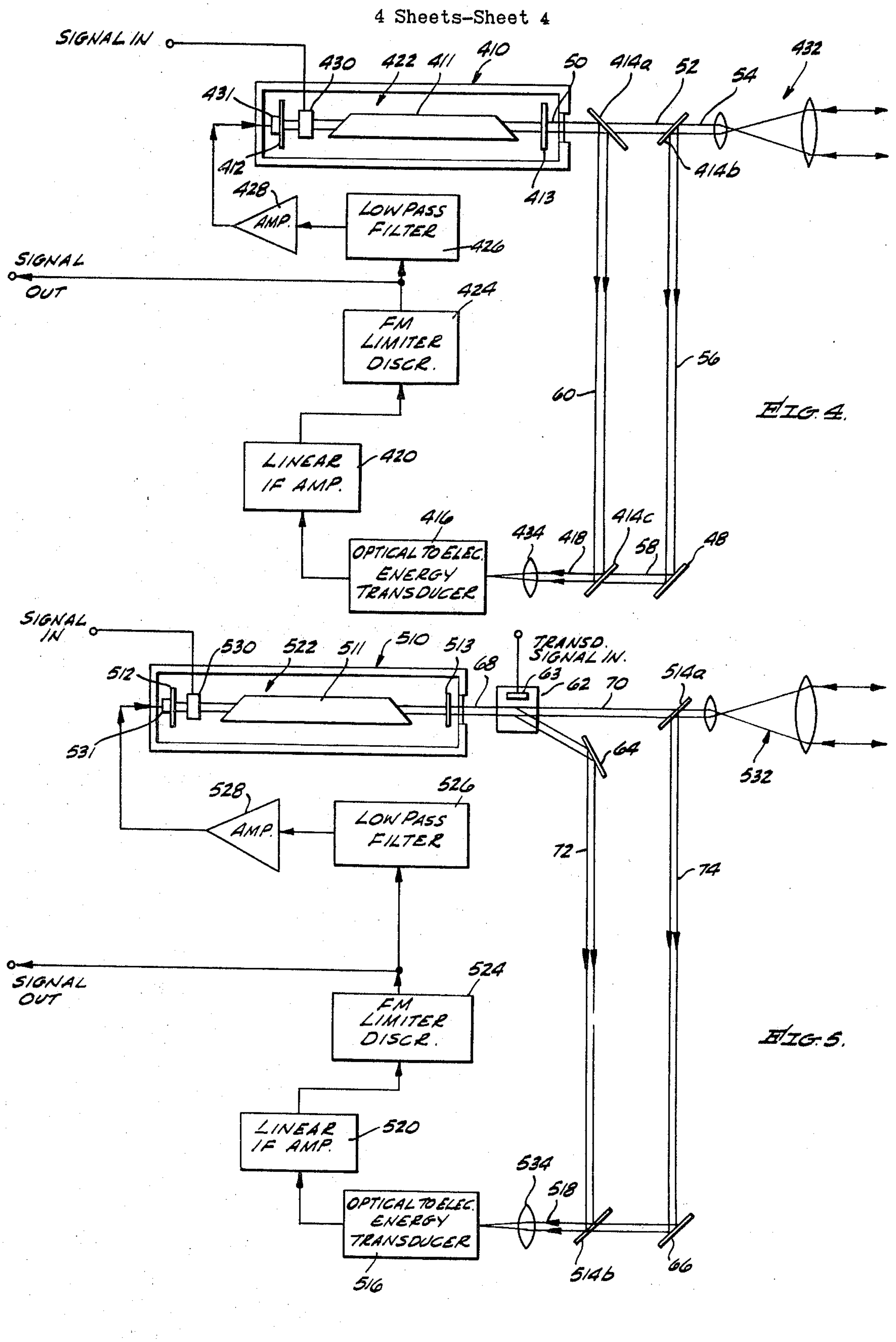
FIG. 4 is a functional-type schematic diagram illustrating a laser communicator transmitter-receiver in accordance with a still further embodiment of the invention.
FIG. 5 is a functional-type schematic diagram illustrating a laser communicator transmitter-receiver in accordance with a still further embodiment of the invention.

A still further embodiment of the invention is illustrated in FIG. 4. The elements of this embodiment that are the same as those of the embodiment illustrated in FIG. 1 carry the same numerical designation except that they are preceded by the numeral 4. The reflectivity of end reflector 413 is lower than in the FIG. 1 embodiment (and may be about 90 percent, for example) so as to allow a significant portion of the laser beam generated by laser oscillator 10 to pass through. In this embodiment three beam splitters **414*a*, 414*b*, and 414*c* are used. Also, a reflector 48 is employed to align the incoming beam with the local laser oscillator beam. Each of the beam splitters, 414*a*, 414*b*, and 414*c*** may have a reflectivity of about 50 percent, for example.

When the transmitter-receiver of FIG. 4 is transmitting, one-half of the frequency-modulated laser beam 50 generated by laser oscillator 410 passes through beam splitter **414*a* to form a beam 52 which impinges upon beam splitter 414*b*. One-half of the beam 52 in turn passes through beam splitter 414*b*, the other half (or one-quarter of the total energy generated by the laser oscillator 410) being reflected outside of the system by beam splitter 414*b* and consequently not being usable by the system. The half of the beam 52 which passes through beam splitter 414*b* is designated as a beam 54 which, after being focused in telescope 432, proceeds to a distant receiving transmitter-receiver device. The 50 percent of the laser beam 50 which is reflected by beam splitter 414*a*, and designated in FIG. 4 as a beam 60, is directed toward beam splitter 414*c* where one-half of beam 60 is reflected and where the other half of the beam 60 passes through beam splitter 414*c* and is lost from the system. The portion of the beam 60 which is reflected by beam splitter 414*c* becomes part of a mixed beam designated as beam 418. This mixed beam 418 is the result of a combination of the portion of beam 60 which is reflected by beam splitter 414*c* and a portion of a received laser beam of a substantially different frequency from that of beam 60 (designated as beam 58) from that distant transmitter-receiver device. Beam 418 is directed through lens 434 to transducer 416**.

When the transmitter-receiver of FIG. 4 is receiving, an incoming beam 54 passes through telescope 432. Fifty percent of beam 54 is reflected by beam splitter **414*b* into a beam 56 which in turn is reflected by reflector 48. The resulting reflected beam 58 is directed by reflector 48 toward beam splitter 414*c*. The 50 percent of the beam 58 that passes through beam splitter 414*c* is mixed with the 50 percent of the local oscillator beam 60 that is reflected by beam splitter 414*c*. The resulting mixed beam 418 (50 percent of beam 60 and 50 percent of beam 58) passes through lens 434 and to transducer 416 where the mixed beam is converted into an electrical signal as described above in connection with the operation of the embodiment in FIG. 1. A portion of beam 50, designated as beam 54, is transmitted to a distant transmitting transmitter-receiver device where it will serve to mix with a portion of the locally generated beam in the distant device and will ultimately be converted into an AFC voltage for the distant device's laser oscillator. It is noted however, that in the embodiment of FIG. 4 approximately 12 decibels or power are lost in the operation of the transmitter-receiver through beam splitters 414*a*, 414*b*, and 414*c*. Moreover, it is pointed out that the embodiment of FIG. 4 may also employ the alternate feedback frequency regulating means of FIGS. 1*a* and 1*b* and the amplitude modulation transmission and reception modification of FIG. 1*c*. The remainder of the operation of the embodiment as illustrated in FIG. 4 is substantially the same as that of the embodiment illustrated in FIG. 1**.

A still further embodiment of the invention is illustrated in FIG. 5. The elements of this embodiment that are the same as those of the embodiment illustrated in FIG. 1 carry the same numerical designation except that they are preceded by the numeral 5. A key advantage of the embodiment illustrated in FIG. 5 is that both the transmitting and receiving transmitter-receiver devices can operate at substantially the same frequency. The frequency differential necessary for heterodyne detection may be furnished by an ultrasonic modulator 62 which may be a Debye-Sears acoustic single sideband modulator which diffracts a laser beam in the infrared frequency range by ultrasonic waves in a liquid medium. $CCl_4$ and $C_2Cl_4$ are suitable liquid mediums for the propagation of the ultrasonic waves for use at the wave lengths of 3.39 microns, for example. An ultrasonic sound wave transducer 63, which by its vibrations causes ultrasonic waves in a contained liquid medium may be used to create the diffracting waves. The transducer 63 may be a 5.4 MHz. X-cut quartz crystal, operated in its fifth harmonic. With an optimum input power of 50 mw. into the acoustical transducer 63, it is possible to produce, for example, a 27 MHz. frequency shift of 1 percent of the infrared laser beam using $CCl_4$ as the liquid medium, for example; and a frequency shift of 10 percent of the beam using $C_2Cl_4$ as the liquid medium, for example. The laser beam 68 generated by laser oscillator 510 passes through the ultrasonic modulator 62 where a primary beam 70 and a diffracted beam 72 are produced. The angle between the beams 70 and 72 may be 6°, for example.

In the FIG. 5 embodiment two beam splitters, 514*a* and 514*b*, and two reflectors, 64 and 66, are employed. Each of the beam splitters, 514*a* and 514*b*, may have a reflectivity of about 50 percent, for example. The reflectivity of end reflector 513 is lower (and may be about 90 percent, for example) than the corresponding end reflector in the embodiment illustrated in FIG. 1, so as to allow a significant portion of the laser beam generated by laser oscillator 10 to pass through the reflector 513.

When the transmitter-receiver of FIG. 5 is transmitting, 90 percent, for example, of beam 68 which is substantially at frequency $f_1$ passes through modulator 62 to become beam 70, and which beam is still at substantially frequency $f_1$. Beam 70 impinges upon beam splitter 514*a*, from which one-half of beam 70 is transmitted to a distant receiving transmitter-receiver device while the other half of beam 70 is deflected outside of and consequently lost to the system. Essentially the remaining 10 percent of beam 68 is frequency shifted by an amount $f_{IF}$ and diffracted away from the direction of beam 70 by means of modulator 62. The resultant diffracted beam 72 at substantially frequency $f_2$ ($f=f_1-f_{IF}$) is reflected by reflector 64 so that it impinges upon beam splitter 514*b*. At beam splitter 514*b* about 50 percent of beam 72 is reflected. A received beam from the distant receiving transmitter-receiver device is partially reflected by beam splitter 514*a*. The resultant beam 74 is reflected by reflector 66 so as to impinge upon beam splitter 514*b* at substantially the same area as does beam 72. The part of beam 74 that passes through beam splitter 514*b* is mixed with that part of beam 72 that is reflected by beam splitter 514*b*. The resultant mixed beam 518 is directed toward optic-to-electric energy transducer 516, via lens 534.

When the transmitter-receiver of FIG. 5 is receiving, an incoming received beam at substantially frequency $f_1$ passes through telescope 532. Fifty percent of this received beam is reflected by beam splitter 514*a* and again reflected by reflector 66 so that it impinges upon beam splitter 514*b*. Approximately 10 percent, for example, of laser oscillator beam 68 is diffracted and phase shifted approximately by frequency $f_{IF}$ by modulator 62. The resultant beam 72 at substantially frequency $f_2$ ($f_2=f_1$ 31 $f_{IF}$) is reflected by reflector 64 and impinges upon substantially the same area of beam splitter 514*b* as does beam 74. The resultant mixed beam 518 is directed, via lens 534, toward optic-to-electric energy transducer 516. The remaining approximately 90 percent of beam 68 that is not deflected by modulator 62 is transmitted, via beam splitter 514*a* and telescope 532, toward a distant transmitting transmitter-receiver device where the beam will mix with a portion of the locally generated beam in the distant device to ultimately provide an AFC voltage for that device's laser oscillator. Approximately 12 db. of power are lost through beam splitters 514*a* and 514*b* in the operation of the transmitter-receiver of FIG. 5. The remainder of the operation of the embodiment illustrated in FIG. 5 is essentially the same as that of the embodiment illustrated in FIG. 1. Moreover, it is pointed out that the embodiment of FIG. 5 may also use the alternative feedback frequency regulating means of FIGS. 1*a* and 1*b* and the amplitude modulation transmission and reception modification of FIG. 1*c*.

Where efficient power utilization is required, or where compact design of equipment is needed, the communication system of this invention can be used with great success. In fact the system is especially applicable to space communications where both high power and quantum limited heterodyne detection are required. Furthermore, since infrared communication beams are not readily detectable with photoemissive image devices such as metascopes the present invention is able to provide distance communication with increased security.

Although the present invention has been shown and described with reference to particular embodiments, nevertheless various changes and modifications obvious to one skilled in the art to which the invention pertains are deemed to lie within the spirit, scope and contemplation of the invention.

We claim:

1. A laser communication heterodyne transmitter-receiver device comprising: laser oscillator means having a pair of end reflectors and a laser medium for generating a first laser energy beam of substantially a first frequency; means for regulating the frequency of said first laser beam; means disposed in the path of said first laser beam between one of said end reflectors and said laser medium for partially reflecting and partially transmitting optical energy such that a portion of said first laser beam is directed toward a distant similar one of said transmitter-receiver devices and such that a portion of a received second laser beam from said distant similar device, and which second laser beam is of substantially a second frequency different from said first frequency, is mixed with a portion of said first laser beam; means for modulating said first laser beam according to an informational signal; optic-to-electric energy transducer means for converting the mixed laser beam into a modulated electrical signal; means for demodulating said electrical signal; and feedback means for applying a signal from said demodulating means to said means for regulating the frequency of said first laser beam.

2. A transmitter-receiver device according to claim 1 in which said means for modulating is a frequency modulating device.

3. A transmitter-receiver device according to claim 2 wherein said means for frequency modulating said first laser beam comprises electrooptic means disposed between said laser medium and one of said reflectors in the path of said first laser beam for changing the electrical length of the path of said first laser beam between said reflectors, and electrical means for activating said electrooptic means with an input electrical signal such that said first laser beam is frequency-modulated according to said input electrical signal.

4. A transmitter-receiver device according to claim 2 wherein said means for frequency modulating said first laser beam comprises a piezoelectric crystal mechanically coupled to one of said reflectors, and means for activating said piezoelectric crystal such that the length of the path of said first laser beam between said reflectors is altered.

5. A transmitter-receiver device according to claim 2 wherein said means for frequency modulating said first laser beam comprises a capacitor microphone including a reflective diaphragm which serves as one of said reflectors, and means for activating said microphone such that the length of the path of said first laser beam between said reflectors is altered.

6. A transmitter-receiver device according to claim 1 in which said means for modulating is an amplitude modulating device.

7. A transmitter-receiver device according to claim 6 wherein said means for amplitude modulating said first laser beam comprises: electrooptic means disposed outside of said laser oscillator means and in the path of a portion of said first laser beam for changing the amplitude of said portion of said first laser beam, and electrical means for activating said electrooptic means with an input electrical signal such that said portion of said first laser beam is amplitude-modulated according to said input electrical signal.

8. A transmitter-receiver device according to claim 1 wherein said optic-to-electric transducer means is a semiconductor photodiode.

9. A transmitter-receiver device according to claim 1 wherein said optic-to-electric transducer means is a superconductor photodiode.

10. A transmitter-receiver device according to claim 1 wherein said end reflectors of said laser oscillator means are disposed parallel to one another.

11. A transmitter-receiver device according to claim 1 wherein said end reflectors of said laser oscillator means are disposed at an angle relative to one another such that they are not parallel.

12. A communication system including at least two operatively associated laser subsystem stations, each of said subsystem stations comprising: laser oscillator means having a pair of end reflectors and a laser medium for generating a first laser beam of substantially a first frequency; means for regulating the frequency of said first laser beam; means disposed in the path of said first laser beam between one of said end reflectors and said laser medium for partially reflecting and partially transmitting optical energy such that a portion of said first laser beam is directed toward a distant other of said subsystem stations and such that a portion of a received second laser beam from said distant other of said subsystem stations, and which second laser beam is of substantially a second frequency different from said first frequency, is mixed with a portion of said first laser beam, means for modulating said first laser beam according to an informational signal; optic-to-electric energy transducer means for converting the mixed laser beam into a modulated electrical signal; means for demodulating said electrical signal; and feedback means for applying a signal from said demodulating means to said means for regulating the frequency of said first laser beam.

13. A laser communication heterodyne transmitter-receiver device comprising: laser oscillator means having a pair of end reflectors and a laser medium for generating a first laser energy beam of substantially a first frequency; means disposed in the path of said first laser beam between one of said end reflectors and said laser medium for partially reflecting and partially transmitting optical energy such that a portion of said first laser beam is directed toward a distant similar one of said transmitter-receiver devices and such that a portion of a received second laser beam from said distant similar device, and which second laser beam is of substantially a second frequency different from said first frequency, is mixed with a portion of said first laser beam, a means for both regulating the frequency of said first laser beam and modulating said first laser beam according to an information signal; optic-to-electric energy transducer means for converting the mixed laser beam into a modulated electrical signal; means for demodulating said electrical signal; and feedback means for applying a signal from said demodulating means to said regulating and modulating means to regulate the frequency of said first laser beam.

PO-1050
(5/69)

UNITED STATES PATENT OFFICE
CERTIFICATE OF CORRECTION

Patent No. 3,573,463 Dated April 6, 1971

Inventor(s) Frank E. Goodwin & Floyd C. Trimble

It is certified that error appears in the above-identified patent and that said Letters Patent are hereby corrected as shown below:

Col. 2, lines 24-26, delete in their entirety.
4, line 17, delete "AFC" and substitute therefor --(AFC)--.
9, line 24, delete "$f_2$ ($f = f_1 - f_{IF}$) and substitute th --$f_2$ ($f_2 = f_1 - f_{IF}$)--
line 45, delete "$f_2$ ($f_2 = f_1$ 31 $f_{IF}$) and substitute therefor --$f_2$ ($f_2 = f_1 - f_{IF}$)

Signed and sealed this 26th day of October 1971.

(SEAL)
Attest:

EDWARD M.FLETCHER,JR.
Attesting Officer

ROBERT GOTTSCHALK
Acting Commissioner of Pa